Figure 1:
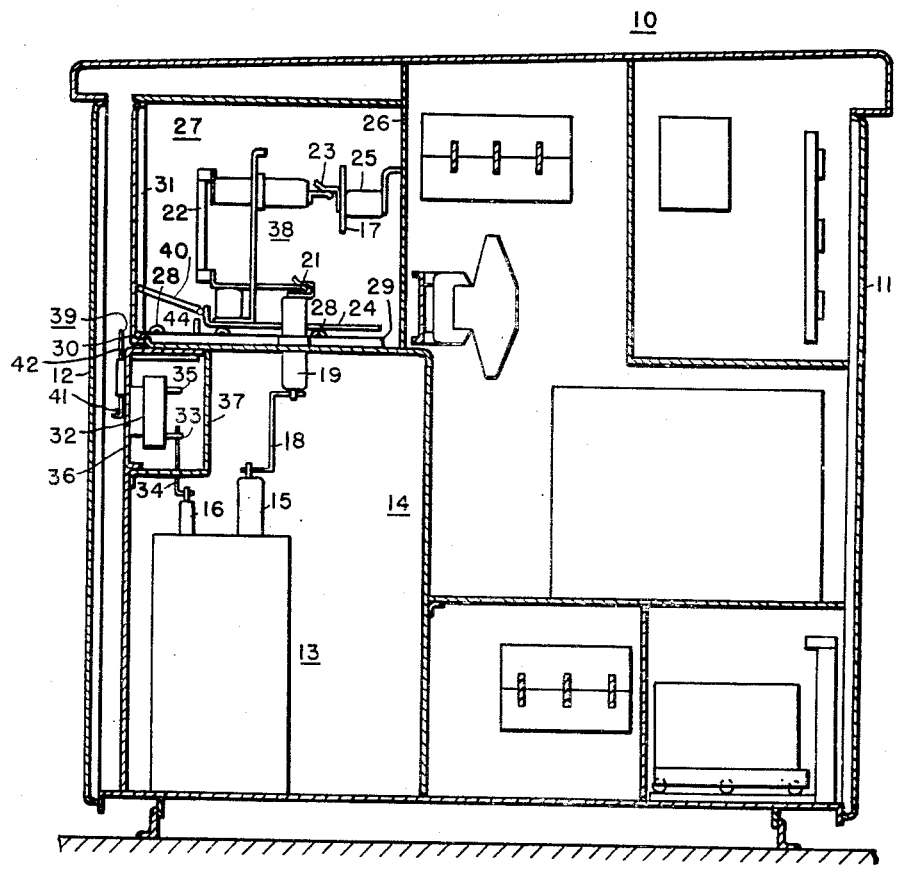

June 26, 1951  G. L. CLAYBOURN ET AL  2,558,074
INTERLOCKING MECHANISM FOR METAL ENCLOSED SWITCHGEARS
Filed Sept. 29, 1949  2 Sheets-Sheet 1

INVENTORS
Glen L. Claybourn
and Paul Kocsis, Jr.

June 26, 1951  G. L. CLAYBOURN ET AL  2,558,074
INTERLOCKING MECHANISM FOR METAL ENCLOSED SWITCHGEARS
Filed Sept. 29, 1949  2 Sheets-Sheet 2

Patented June 26, 1951

2,558,074

UNITED STATES PATENT OFFICE 2,558,074

INTERLOCKING MECHANISM FOR METAL ENCLOSED SWITCHGEARS

Glen L. Claybourn and Paul Kocsis, Jr., Pittsburgh, Pa., assignors to Westinghouse Electric Corporation, East Pittsburgh, Pa., a corporation of Pennsylvania Application September 29, 1949, Serial No. 118,664

7 Claims. (Cl. 175—298)

Our invention relates, generally, to metal enclosed switchgear and, more particularly, to interlocking mechanisms for metal enclosed switchgear.

In electric power distribution systems it is customary to ensure continuity of service on a load circuit by supplying power through two transformers, the primary windings of which may be connected to different power buses. Since the secondary windings of both transformers are normally connected to the same load circuit, it is necessary to disconnect the secondary winding as well as the primary winding of a transformer in order to isolate the transformer for inspection purposes. Otherwise, the high voltage terminals of the primary winding will be energized by a feed-back voltage through the secondary winding.

In metal enclosed switchgear, the secondary winding of a transformer may be disconnected from the load circuit by means of a circuit breaker mounted in the switchgear unit housing and the primary winding may be isolated by an isolating device of the drawout type which carries the protective fuses for the transformer and may be withdrawn to a position in the housing in which both the fuses and the primary terminals are completely isolated.

An object of our invention is to so interlock the primary circuit isolating device and the secondary circuit breaker that the secondary circuit must be open before the isolating device can be made accessible or disconnected.

Another object of our invention is to prevent the secondary load circuit from being connected to the transformer while the primary circuit connections are accessible.

A further object of our invention is to permit the secondary circuit breaker to be closed only when the primary disconnect contact members are engaged.

A more general object of our invention is to provide an interlocking mechanism for metal enclosed switchgear which shall be simple and efficient in operation and which may be economically manufactured and installed.

Other objects of our invention will be explained fully hereinafter or will be apparent to those skilled in the art.

In accordance with one embodiment of our invention, the operating handle of the circuit breaker for connecting the secondary winding of a transformer to the load circuit is so interlocked with a primary circuit isolating device of the drawout type that the circuit breaker must be open before the isolating device can be made accessible or disconnected, and the circuit breaker cannot be closed while the isolating device is withdrawn to the disconnected position.

Figure 2:
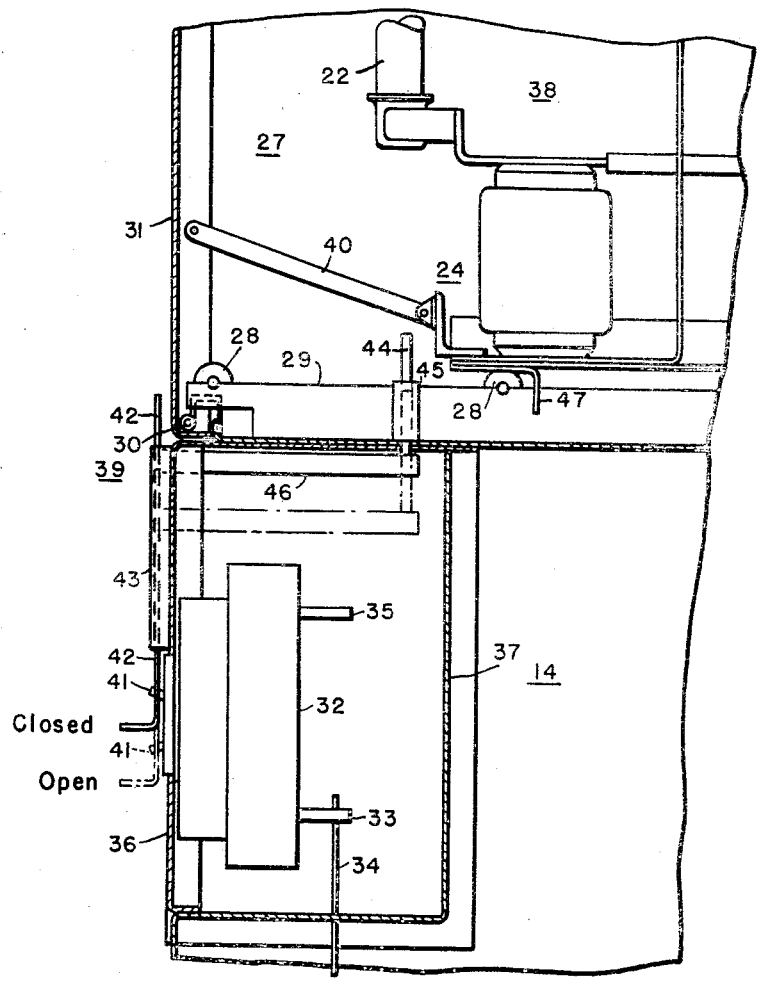

For a better understanding of the nature and objects of our invention, reference may be had to the following detailed description, taken in conjection with the accompanying drawing, in which:

Figure 1 is a view, partly in section and partly in side elevation, of a metal enclosed switchgear unit having an interlocking mechanism embodying the principal features of our invention, and Fig. 2 is an enlarged view of a portion of the switchgear unit, showing details of the interlocking mechanism.

Referring to the drawing, and particularly to Fig. 1, the structure shown therein comprises a switchgear unit housing 10 of the metal enclosed type which is suitable for outdoor service. The housing 10 is provided with a plurality of compartments in which switchgear apparatus may be mounted as illustrated in the drawing. Access to the apparatus at the front of the housing may be had through a door 11. Likewise, access to the apparatus at the rear of the housing may be had through a similar door 12.

As shown, an operating transformer 13 may be mounted at the rear of the housing in a compartment 14. The transformer 13 is provided with primary terminals 15 and secondary terminals 16. One of the primary terminals 15 may be connected to a power conductor 17 through a conductor 18, an insulated terminal 19 which is mounted in the top of the compartment 14, disconnect contact members 21, a fuse 22, and disconnect contact members 23. It will be understood that the other primary terminal 15 may be connected to a power conductor in a similar manner.

In accordance with the usual practice, the fuses 22 are mounted on a truck or carriage 24 which may be withdrawn to a position in which the circuit through the contact members 21 and 23 is disconnected, thereby isolating the fuses 22 and the primary terminals 15 of the transformer 13 from the primary power circuit.

The power conductors 17 may be supported by insulators 25 which are mounted on a wall 26 of a compartment 27 which contains the truck 24. The truck 24 runs on rollers 28 which are mounted in a member 29 disposed at the bottom of the compartment 27. Access to the compartment 27 may be had through a door 31 which may be hinged at 30.

As explained hereinbefore, it is necessary to disconnect the secondary terminals 16 of the transformer 13 from the load circuit to which they are normally connected in order to prevent a feed-back voltage on the primary terminals 15 and the fuses 22 prior to the isolation of the fuses by withdrawing the truck 24. Thus, the secondary terminals 16 may be disconnected from the load circuit by means of a secondary circuit breaker 32.

The circuit breaker 32 is provided with one set of terminals 33 which may be connected to the transformer secondary terminals 16 by conductors 34 and another set of terminals 35 which may be connected to the load circuit by conductors (not shown). The circuit breaker 32 may be mounted on a plate 36 and separated from the transformer 13 by a cover plate 37. The mounting plate 36 and the cover plate 37 may be attached to the walls of the compartment 14.

In order to ensure that the secondary load circuit must be opened before the primary isolating device 38, which comprises the truck 24 and the fuses 22, can be made accessible or disconnected, an interlocking mechanism 39 is provided for controlling the opening of the door 31 to the compartment 27, the withdrawing of the truck 24, and the operation of the circuit breaker handle 41. The door 31 may be so connected to the truck 24 by links 40 that the truck is withdrawn when the door is opened.

As shown more clearly in the enlarged view in Fig. 2, the interlocking mechanism 39 comprises a slidable bar 42 which engages the circuit breaker handle 41 and slides vertically in a guide plate 43 attached to the outside of the mounting plate 36. A shear pin 44, which slides vertically in a guide collar 45, is connected to the bar 42 by a horizontally disposed bar 46. The bar 46 extends through an opening in the mounting plate 36.

As shown by the solid lines, the upper end of the bar 42 extends above the top of the guide plate 43 and the bottom of the door 31 when the bar 42 is raised to its uppermost position to actuate the handle 41 to the closed position of the circuit breaker mechanism. Thus, the exposed end of the bar 42 interferes with the opening of the door and functions as a target to indicate that the breaker 32 is closed. Also the shear pin 44 extends upwardly in front of the truck 24 which carries the fuses 22 and prevents the truck from being withdrawn to disengage the primary contact members 21 and 23. Thus, the door 31 can not be opened, nor can the truck 24 be withdrawn while the secondary circuit breaker 32 is closed.

In order to open the door 31 and withdraw the truck 24, it is necessary to lower the bar 42 to its lowermost position as shown by the broken lines in Fig. 2. When the bar 42 is in its lowermost position, the handle 41 is actuated to open the circuit breaker 32, thereby disconnecting the secondary circuits of the transformer 13.

It will be seen that when the truck 24 is withdrawn to its disconnected position, the truck frame passes over the shear pin 44, thereby preventing the bar 42 from being raised while the truck 24 is withdrawn. Therefore, the circuit breaker 32 can not be closed while the truck 24 is withdrawn since the handle 41 can not be actuated to the closed position of the circuit breaker mechanism. In this manner, the secondary terminals 16 of the transformer can not be connected to the load circuit while the isolating device 38 is withdrawn to its disconnected position.

It will be understood that outward movement of the truck 24 is normally limited by a stop member 47 which engages the cell structure.

From the foregoing description, it is apparent that we have provided a simple interlocking mechanism for ensuring the proper sequence of operation between the secondary circuit breaker and the primary isolating device of a transformer or other electrical apparatus. Since the interlocking mechanism is mechanical in structure the proper functioning of the mechanism is assured and it may be more readily manufactured and assembled in switchgear apparatus than interlocking mechanisms of other types.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In switchgear apparatus, in combination, a housing having a plurality of compartments therein, a transformer in one compartment, a transformer primary isolating device in a second compartment, a transformer secondary circuit breaker, a door for the second compartment, a handle for operating the circuit breaker mechanism, and mechanical means disposed to engage the handle for actuating said handle, said mechanical means being disposed to engage the door directly to prevent the opening of said door while said handle is in the closed position of the circuit breaker mechanism.

2. In switchgear apparatus, in combination, a housing having a plurality of compartments therein, a transformer in one compartment, a transformer primary isolating device in a second compartment, a transformer secondary circuit breaker, a door for the second compartment, a handle for operating the circuit breaker mechanism and slidable means disposed exteriorly of the transformer compartment to engage the handle for actuating said handle, said slidable means being disposed to engage the door directly to prevent the opening of said door while said handle is in the closed position of the circuit breaker mechanism.

3. In switchgear apparatus, in combination, a housing having a plurality of compartments therein, a transformer in one compartment, a transformer primary isolating device disposed in a second compartment and withdrawable to a disconnecting position, a transformer secondary circuit breaker, a door for the second compartment, a handle for operating the circuit breaker mechanism, and interlocking means engaging the handle and disposed to engage the door for preventing the opening of said door while said handle is in the closed position of the circuit breaker mechanism, said interlocking means being disposed to prevent actuating said handle to close the circuit breaker while said isolating device is in the disconnected position.

4. In switchgear apparatus, in combination, a housing having a plurality of compartments therein, a transformer in one compartment, a transformer primary isolating device disposed in a second compartment and withdrawable to a disconnecting position, a transformer secondary circuit breaker, a door for the second compartment, linkage means connecting the door to the isolating device to withdraw the device when the door is opened, a handle for operating the circuit breaker mechanism, and mechanical interlocking means engaging the handle and disposed to engage the door for preventing the opening of said door while said handle is in the closed position of the circuit breaker mechanism, said interlocking means being disposed to prevent actuating said handle to close the circuit breaker while said isolating device is withdrawn to the disconnected position.

5. In switchgear apparatus, in combination, a housing having a plurality of compartments therein, a transformer in one compartment, a transformer primary isolating device disposed in a second compartment and withdrawable to a disconnecting position, a transformer secondary circuit breaker, a door for the second compartment, a handle for operating the circuit breaker mechanism, and mechanical interlocking means engaging said handle and disposed to engage the door to prevent the opening of said door while said handle is in the closed position of the circuit breaker mechanism, said interlocking means being disposed to prevent closing the circuit breaker while said isolating device is in the disconnected position.

6. In switchgear apparatus, in combination, a housing having a plurality of compartments therein, a transformer in one compartment, a transformer primary isolating device disposed in a second compartment and withdrawable to a disconnecting position, a transformer secondary circuit breaker, a door for the second compartment, linkage means connecting the door to the isolating device to withdraw the device when the door is opened, a handle for operating the circuit breaker mechanism, and mechanical means disposed to engage the handle for actuating said handle, said actuating means being disposed to engage the door to prevent the opening of said door while said handle is in the closed position of the circuit breaker mechanism and to prevent closing the circuit breaker while said isolating device is in the disconnected position.

7. In switchgear apparatus, in combination, a housing having a plurality of compartments therein, a transformer in one compartment, a transformer primary isolating device disposed in a second compartment and withdrawable to a disconnecting position, a transformer secondary circuit breaker, a door for the second compartment, a handle for operating the circuit breaker mechanism, slidable means disposed exteriorly of the transformer compartment to engage the handle directly for actuating said handle, said slidable means being disposed to engage the door directly to prevent the opening of said door while the circuit breaker is closed, and mechanical means connected to said slidable means to prevent closing the circuit breaker while said isolating device is in the disconnecting position.

GLEN L. CLAYBOURN.
PAUL KOCSIS, Jr.

REFERENCES CITED

The following references are of record in the file of this patent:

UNITED STATES PATENTS

| Number | Name | Date |
|---|---|---|
| 1,749,070 | Esseltine | Mar. 4, 1930 |
| 2,151,756 | Fletcher | Mar. 28, 1939 |
| 2,363,364 | Rugg | Nov. 21, 1944 |
| 2,443,664 | Rathfus | June 22, 1948 |